United States Patent [19]
Mulvihill et al.

[11] Patent Number: 5,899,121
[45] Date of Patent: May 4, 1999

[54] FLUID BIASED TRANSMISSION RANGE VALVE

[75] Inventors: John Gerard Mulvihill, Portage; Terry E. Teeter, Mattawan, both of Mich.

[73] Assignee: Eaton Corporation, Cleveland, Ohio

[21] Appl. No.: 08/998,557

[22] Filed: Dec. 29, 1997

[51] Int. Cl.[6] .................................................. F16H 59/08
[52] U.S. Cl. .................................................. 74/745; 74/335
[58] Field of Search ..................................... 74/745, 335

[56] References Cited

U.S. PATENT DOCUMENTS

| | | |
|---|---|---|
| 3,229,551 | 1/1966 | Stuckey . |
| 4,275,612 | 6/1981 | Silvester . |
| 4,445,393 | 5/1984 | Braun . |
| 4,450,869 | 5/1984 | Acker . |
| 4,555,959 | 12/1985 | Braun .................................... 74/745 |
| 4,584,895 | 4/1986 | Holmes . |
| 4,722,237 | 2/1988 | McNinch, Jr. . |
| 4,788,875 | 12/1988 | Genise ..................................... 74/335 |
| 4,793,378 | 12/1988 | Loeffler et al. . |
| 4,974,474 | 12/1990 | Newbigging . |
| 5,092,187 | 3/1992 | Irwin ....................................... 74/335 |
| 5,144,863 | 9/1992 | Wood ...................................... 74/745 |
| 5,199,312 | 4/1993 | Huggins et al. . |
| 5,218,878 | 6/1993 | Monette et al. ........................ 74/335 |
| 5,528,949 | 6/1996 | Stainton et al. ........................ 74/335 |
| 5,669,265 | 9/1997 | Adler ...................................... 74/335 |

*Primary Examiner*—Dirk Wright
*Attorney, Agent, or Firm*—Brooks & Kushman P.C.

[57] ABSTRACT

A transmission range valve replaces a traditional spring bias with a pressurized fluid bias to prevent an unintended range change in the event of a significant fluid pressure decrease or loss. Because pressurized fluid is used both for biasing the range valve and for shifting the range valve to effect an auxiliary section range change, a pressure drop or loss of supply pressure will not result in a change of state of the range valve as may occur with prior art spring biased valves.

4 Claims, 9 Drawing Sheets

Fig. 9

FLUID BIASED TRANSMISSION RANGE VALVE

TECHNICAL FIELD

The present invention relates to a valve assembly for controlling the auxiliary section actuator of a vehicular compound transmission.

BACKGROUND ART

Compound vehicular transmissions having a main section connected in series with an auxiliary section are well known in the art. Typically, the main section is shifted directly with a shift lever connected to a shift bar housing or single shift shaft while the auxiliary section, whether a range section, splitter section, or combined range/splitter section, is shifted remotely using one or more valves and pistons. An auxiliary section ratio change may be indicated by the position of the shift lever, or may be initiated by a separate switch on the shift lever, such as a hi/lo range switch and/or a hi/lo split switch.

Since the range section typically utilizes synchronized jaw clutches, various systems have been developed to assure that a range shift is initiated and completed while the main section is in neutral to prevent undue wear and/or damage to the range section synchronized jaw clutches. Systems which prevent or delay initiation of a range section shift until the main section is in neutral are disclosed in U.S. Pat. Nos. 2,654,268; 3,138,965; 3,229,551; 4,060,005; 4,450,869; 4,793,378; and 4,974,474 the disclosures of which are hereby incorporated by reference. A valve assembly for protecting the range section synchronized jaw clutches in the event that the main section shift is completed before the range section shift is disclosed in U.S. Pat. No. 5,193,410, the disclosure of which is hereby incorporated by reference in its entirety.

U.S. Pat. No. 5,193,410 discloses a valve assembly which controls pressurizing and exhausting of a differential area piston to control the force applied to shift the range section based on the neutral/engaged condition of the main section. The valve assembly uses a valve which is spring biased to a first position for engaging a high speed auxiliary section ratio with a relatively high force. The spring bias is overcome by pressurized fluid to shift the valve to a second position for engaging a low speed auxiliary section ratio. However, if the fluid pressure decreases below a predetermined threshold for any reason, such as a system leak or compressor malfunction, the spring bias may shift the valve to the first position resulting in an unintended ratio change in the range section.

SUMMARY OF THE INVENTION

Thus, it is an object of the present invention to provide a system and method for preventing an unintended range section ratio change due to fluid pressure loss.

A further object of the present invention is to provide a range valve assembly which uses a pressurized fluid bias to prevent an unintended change of state due to a reduced pressure.

In carrying out the above objects and other objects and features of the present invention, a valve assembly for use in a control system for controlling a pressurized fluid operated shift actuator for an auxiliary transmission section of a compound transmission includes biasing means for biasing the valve toward a first position using fluid from a source of pressurized fluid to reduce and/or eliminate the possibility of a valve change of state resulting from a pressure drop of the pressurized fluid. The pressurized fluid bias provides a variable biasing force which is proportional to the pressure of the pressurized fluid. As such, the valve state or position is maintained during an unexpected loss of fluid pressure.

The present invention has a number of attendant advantages which will be recognized by those of skill in the art. As one example, the present invention provides protection of the range section synchronized jaw clutches by preventing an unintended range section ratio change.

The above objects and other objects, features, and advantages of the present invention will be readily appreciated by one of ordinary skill in this art from the following detailed description of the best mode for carrying out the invention when taken in connection with the accompanying drawings.

BEST MODE(S) FOR CARRYING OUT THE INVENTION

Figure 1:
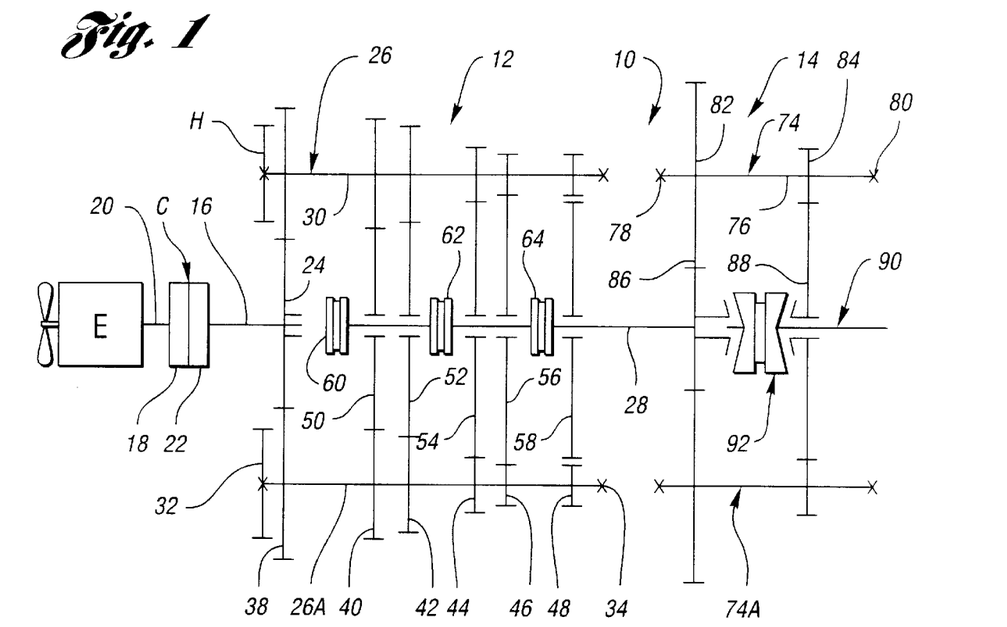
FIG. 1 is a schematic illustration of a compound transmission having a range type auxiliary section and utilizing a range section valve assembly according to the present invention.

Certain terminology will be used in the following description for convenience in reference only and will not be limiting. The words "upwardly", "downwardly", "rightwardly", and "leftwardly" will designate directions in the drawings to which reference is made. The words "forward" and "rearward", will refer respectively to the front and rear ends of the transmission as conventionally mounted in a vehicle, being respectively from left and right sides of the transmission as illustrated in FIG. 1. The words "inwardly" and "outwardly" will refer to directions toward and away from, respectively, the geometric center of the device and designated parts thereof. This terminology will include the words above specifically mentioned, derivatives thereof, and words of similar import.

The term "compound transmission" is used to designate a change speed or change gear transmission having a multiple forward speed main transmission section and a multiple speed auxiliary transmission section connected in series where the selected gear reduction in the main transmission section may be compounded by further selected gear reduction in the auxiliary transmission section. "Synchronized clutch assembly" and words of similar import designate a positive, jaw-type clutch assembly utilized to nonrotatably couple a selected gear to a shaft by means of a positive clutch in which attempted engagement of the clutch is prevented until the members of the clutch are at substantially synchronous rotation. Relatively large capacity friction means are utilized with the clutch members and are sufficient, upon initiation of a clutch engagement, to cause the clutch members and all members rotating therewith to rotate at substantially synchronous speed.

Figure 2:
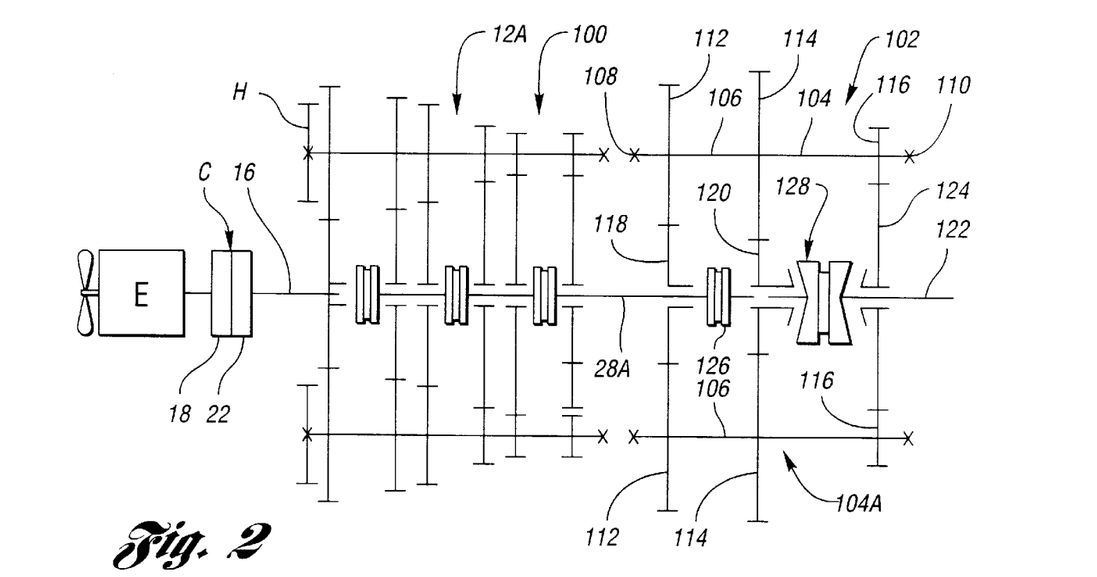
FIG. 2 is a schematic illustration of a compound transmission having a combined splitter/range type auxiliary section utilizing a range protection valve assembly and fluid biased range valve according to the present invention.

The terms "neutral" and "not engaged" are used interchangeably and refer to a main transmission section condition wherein torque is not transferred from the transmission input shaft to the mainshaft (in transmissions of the general type illustrated in FIGS. 1 and 2). The terms "not neutral" and "engaged" are used interchangeably and refer to a main transmission section condition where a main section drive ratio is engaged and drive torque is transferred from the transmission input shaft to the main shaft (in transmissions of the general type illustrated in FIGS. 1 and 2).

The term "high speed" ratio refers to that ratio of a transmission section wherein the rotational speed of the output is greatest for a given input rotational speed.

Figure 1A:
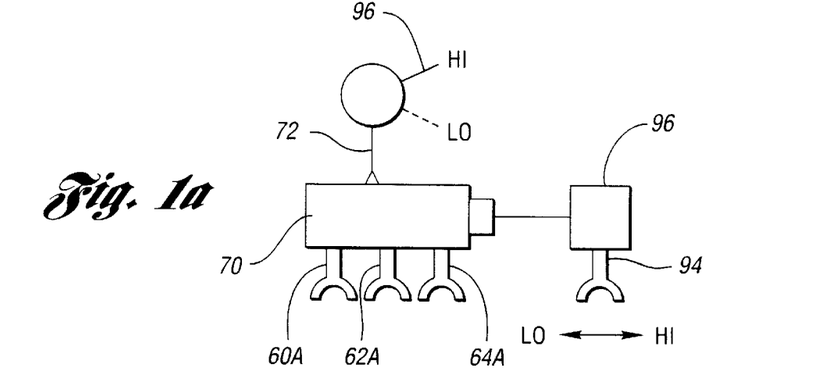
FIG. 1A is a schematic illustration of the shifting mechanisms of the transmission of FIG. 1.
Figure 1B:
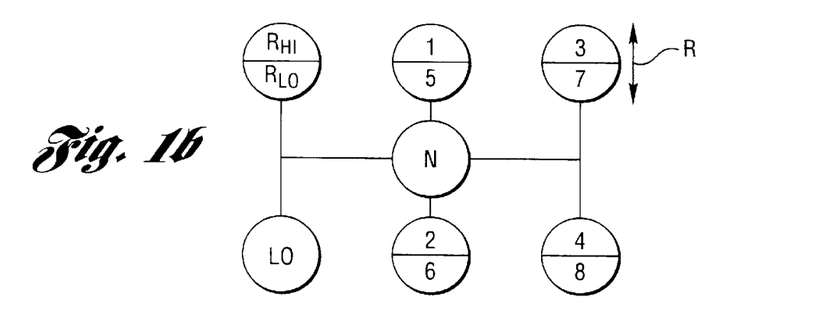
FIG. 1B is a schematic illustration of the "repeat H" type shift pattern of the transmission of FIG. 1.
Figure 1C:
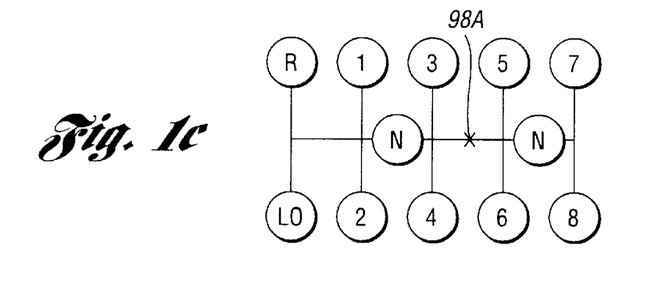
FIG. 1C is a schematic illustration of a "double H" type shift pattern for the transmission of FIG. 1.

Referring to FIGS. 1, 1A, and 1B, a range type compound transmission 10 is illustrated. Compound transmission 10 comprises a multiple speed main transmission section 12 connected in series with a range type auxiliary section 14. Transmission 10 is housed within a housing H and includes an input shaft 16 driven by an engine, such as diesel engine E, through a selectively disengaged, normally engaged master clutch C having an input or driving portion 18 drivingly connected to the engine crankshaft 20 and a driven portion 22 rotatably fixed to the transmission input shaft 16.

In main transmission section 12, input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62, and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as well known in the prior art. Clutch collars 60, 62 and 64 may be of the well known synchronized or nonsynchronized double acting jaw clutch type.

Mainshaft gear 58 is the reverse gear and is in continuous meshing engagement with countershaft gears 48 by means of conventional intermediate idler gears (not shown). While main transmission section 12 does provide five selectable forward speed ratios, the lowest forward speed ratio, namely that provided by drivingly connecting mainshaft drive gear 56 to mainshaft 28, is often of such a high gear reduction that it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" or "(4+1)" main section as only four of the forward speeds are compounded by the auxiliary range transmission section 14.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62, and 64 is engageable at a given time as main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 which is fixed for rotation with mainshaft 28. Auxiliary section countershaft gears 84 are constantly meshed with output gear 88 which surrounds transmission output shaft 90.

A two-position synchronized jaw clutch assembly 92 is axially positioned by means of shift fork 94 and the range section shifting actuator assembly 96. Jaw clutch assembly 92 is provided for clutching either gear 88 to output shaft 90 (for low range operation), or gear 86 to output shaft 90 (for direct or high range operation). The "repeat H" type shift pattern for compound range type transmission 10 is schematically illustrated in FIG. 1B. Selection and/or preselection of low or high range operation of the transmission 10 is accomplished using an operator actuated switch or button 98 which is usually located at the shift lever 72.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62, or 64 may be of the synchronized jaw clutch type. Likewise, transmission sections 12 and/or 14 may be of the single countershaft type.

Main transmission section 12 is controlled by axial movement of at least one shift rail or shift shaft contained within shift bar housing 70 and controlled by operation of shift lever 72. As is known, shift lever 72 may be mounted directly to, or remotely from, the transmission. Devices of this type are well known in the prior art and may be seen by reference to U.S. Pat. No. 4,621,537, the disclosure of which is hereby incorporated by reference. The range section is controlled by operation of button 98, or a position switch 98A in the case of a "double H" type control, both well known in the prior art. Shift bar housing 70 may be a conventional multiple shift rail, well known in the prior art as may be seen by reference to U.S. Pat. Nos. 4,782,719; 4,738,863; 4,722,237 and 4,614,126, the disclosures of which are incorporated by reference, or a single shift shaft, also well known in the art.

The control system of the present invention is equally applicable to compound transmissions having range, combined range/splitter or splitter/range type auxiliary sections.

Referring to FIG. 2, compound change gear mechanical transmission 100 is an eighteen forward speed transmission comprising a main transmission section 12A, identical, or substantially identical, to main transmission section 12 described above in reference to transmission 10. Main transmission section 12A of transmission 100 differs from main transmission section 12 of transmission 10 only in that main shaft 8A extends slightly further into the auxiliary transmission section 102 than does main shaft 28 extend into auxiliary transmission section 14. In view of the substantially identical structure of main transmission sections 12 and 12A, main transmission section 12A will not be described again in detail.

Auxiliary transmission section 102 includes two substantially identical auxiliary countershaft assemblies 104 and 104A, each comprising an auxiliary countershaft 106 supported by bearings 108 and 110 in housing H and carrying three auxiliary section countershaft gears 112, 114 and 116 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support auxiliary section splitter/range gear 120 which surrounds the output shaft 122 at the end thereof adjacent the coaxial end of mainshaft 28A. Auxiliary section countershaft gears 116 constantly mesh and support auxiliary section range gear 124, which surrounds output shaft 122.

A sliding two position jaw clutch collar 126 is utilized to selectively couple either splitter gear 118 or splitter/range gear 120 to mainshaft 28A, while a two position synchronized assembly 128 is utilized to selectively couple splitter/range gear 120 or range gear 124 to output shaft 122. The structure and function of double acting sliding jaw clutch collar 126 is substantially identical to the structure and function of sliding clutch collars 60, 62, and 64 utilized in connection with transmission 10. The structure and function of double acting synchronized clutch assembly 128 is substantially identical to the structure and function of synchronized clutch assembly 92 utilized in connection with transmission 10. Synchronized clutch assemblies, such as assemblies 92 and 128, are well known in the prior art as may be seen by reference to U.S. Pat. Nos. 4,462,489; 4,125,179 and 2,667,955, the disclosures of all of which are incorporated by reference.

Such clutches typically include a pair of axially engageable jaw clutch members, a sensor/blocker device for sensing nonsynchronous rotation of the jaw clutch members and blocking axial engagement during nonsynchronous rotation, and a pair of friction surfaces, often conical, which are urged into contact to frictionally connect the jaw clutch members to cause substantially synchronous rotation thereof. During attempted engagement of such assemblies, assuming a substantial nonsynchronous condition, the clutch will assume a blocked position wherein the blocker device prevents axial engagement of the jaw clutch members and the friction surfaces are engaged under force. If the clutch assembly remains in the blocked position under a high axial engagement force while the main transmission is engaged for an extended period of time, excessive torque loading can damage and/or destroy the friction surfaces. The detailed structure of such an auxiliary section 102 may be seen by reference to U.S. Pat. No. 5,193,410.

Gear 118 surrounds mainshaft 28A and is normally free to rotate relative thereto and is axially retained relative to the mainshaft 28A by means of retainers. Clutch teeth present tapered surfaces which are inclined at about 35° relative to the axis of the mainshaft 28A which provides an advantageous interaction tending to resist nonsynchronous engagement and also tending to cause a synchronous rotation as is described in greater detail in U.S. Pat. No. 3,265,173, the disclosure of which is hereby incorporated by reference. The clutch teeth are provided with similar complementary tapered surfaces.

Splitter/range gear 120 is rotatably supported at the inward end of output shaft 122 by means of a pair of thrust bearings. Range gear 124 surrounds output shaft 122 and is axially retained thereon by means of thrust washers. Located axially between gears 120 and 124, and rotationally fixed to output shaft 122 by means of external splines and internal splines, is the double acting two position synchronized clutch assembly 128. Many of the well known synchronized positive clutch structures are suitable for use in an auxiliary transmission section according to the present invention. Synchronized clutch assembly 128 is preferably of the pin type described in above mentioned U.S. Pat. No. 4,462,489. Gears 120 and 124 include cone friction surfaces for frictional synchronizing engagement with matching frictional cone surfaces of the synchronized clutch assembly. Synchronizing assembly 128 may also include a plurality of spring pins (not shown) for providing initial engagement of the conical friction surfaces at the initiation of a clutch engagement operation.

Output shaft 122 is supported by bearings in housing H and extends therefrom for attachment of a yolk member or the like which typically forms a portion of a universal joint for driving a propeller shaft to a differential or the like. Output shaft 122 may also carry a speedometer gear and/or various sealing elements (not shown).

As may be seen by reference to FIG. 2, by selectively axially positioning both the splitter clutch 126 and the range clutch 128 in the forward and rearward axial positions thereof, four distinct ratios of main shaft rotation to output shaft rotation may be provided. Accordingly, auxiliary transmission section 102 is a 3-layer auxiliary section of the combined range and splitter type providing four selectable speeds or drive ratios between the input (countershaft 28A) and output (output shaft 122) thereof. Transmissions of this type are well known in the prior art and are sold by assignee Eaton Corporation under the trade names "Super 10" and "Super 18" and may be seen in greater detail by reference to U.S. Pat. No. 4,754,665, the disclosure of which is incorporated herein by reference.

Figure 2A:
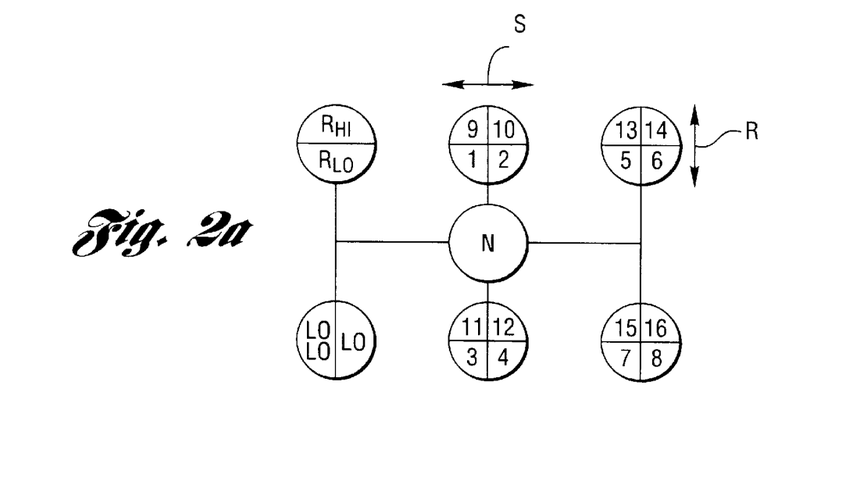
FIG. 2A is a schematic illustration of the shift pattern for the transmission of FIG. 2.

The shift pattern for the transmission 100 is schematically illustrated in FIG. 2A wherein the "S" arrow indicates a splitter shift and the "R" arrow indicates a range shift.

Figure 3:
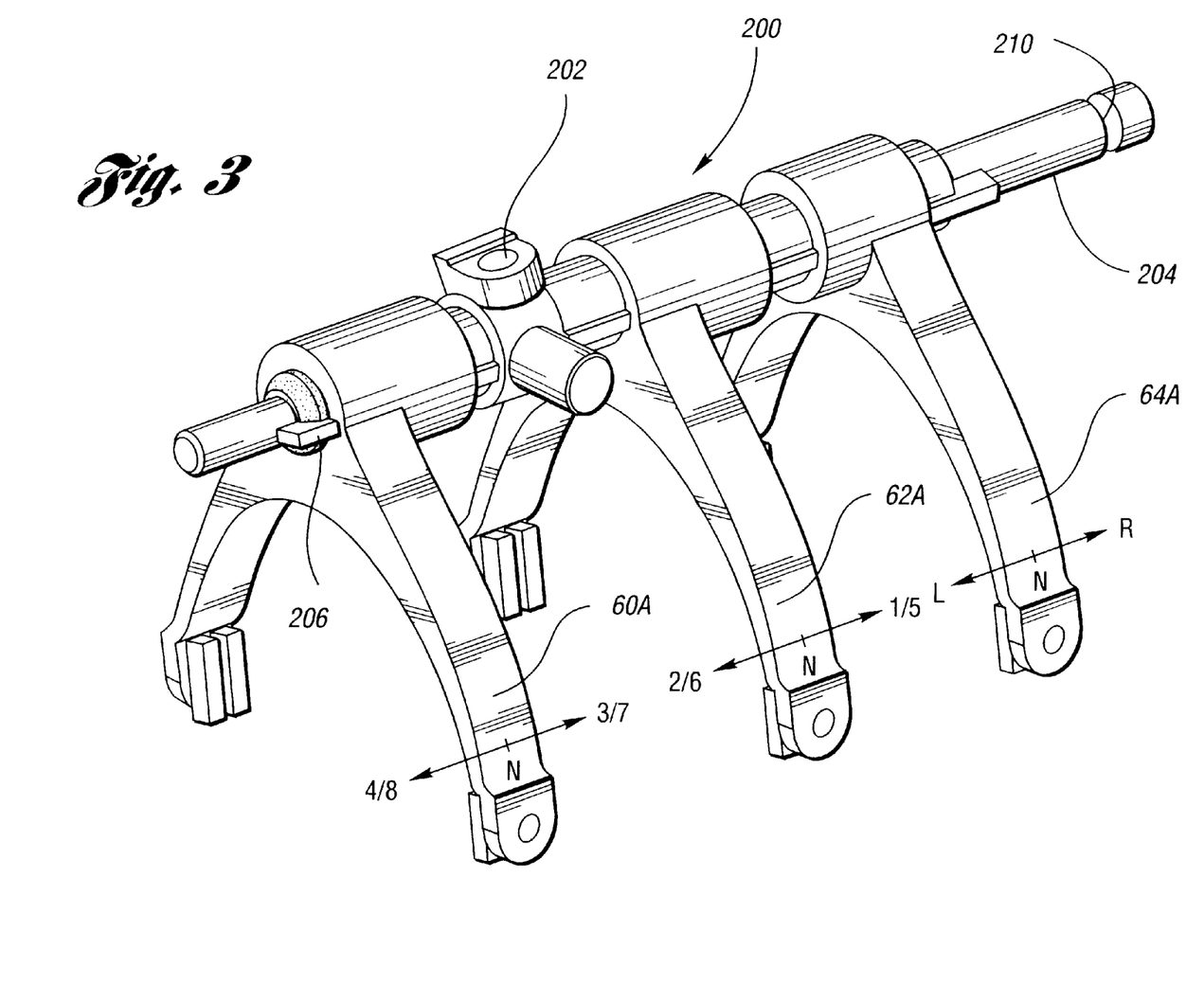
FIG. 3 is a perspective view of a shifting mechanism using a single shift shaft for use with a transmission incorporating a fluid biased range valve according to the present invention.

In one embodiment of the present invention, a single shift shaft type shifting mechanism 200 of the type illustrated in FIG. 3 is utilized. Mechanisms of this type are known in the prior art as may be seen by reference to U.S. Pat. Nos. 4,920,815 and 4,621,537, the disclosures of which are incorporated herein by reference.

Briefly, shift lever 98 will interact with block member 202 to cause rotational or axial movement of shaft 204 relative to the transmission housing. Rotational movement will cause keys, such as key 206 and another unseen key, to interact with lands or slots provided in the hubs of shift forks 60A, 62A, and 64A to axially fix two of the shift forks relative to the housing and to axially fix the other shift fork to shaft 204. Axial movement of shaft 204 and the selected shift fork will then result in engagement and disengagement of the associated jaw clutches.

Accordingly, by monitoring of the axial position of a selected segment of shift shaft 204, such as one or more neutral detent notches 210, the in-neutral/not-in-neutral condition of the main section 12 of transmission 10 may be sensed.

The present invention is also applicable to compound transmissions utilizing the well known multiple parallel rail type shift bar housing assemblies as may be seen by reference to U.S. Pat. Nos. 4,445,393; 4,275,612; 4,584,895 and 4,722,237, the disclosures of which are hereby incorporated by reference. Such devices typically include an assembly extending perpendicular to the shift rails (often associated with a shift rail interlock mechanism) which will assume a first position when all of the shift rails are in an axially centered neutral position or a second position when any one of the shift rails is displaced from the axially centered neutral position.

The present invention is also applicable to compound transmissions wherein other mechanical, electrical, electromagnetic or other types of sensors are utilized to sense conditions indicative of transmission main section neutral (not engaged) or not neutral (engaged) conditions.

Although the auxiliary transmission sections are typically attached to the main transmission section, the term "auxiliary transmission section" as used herein is also applicable to detached drive train devices such as multiple-speed axles, multiple-speed transfer cases, and the like.

While the present invention is equally applicable to transmission 10 illustrated in FIG. 1 and transmission 100 illustrated in FIG. 2, as well as other compound transmissions utilizing synchronized auxiliary section jaw clutch assemblies, for purposes of simplification and ease of understanding, the present invention will be described primarily as utilized with the compound range type transmission illustrated in FIGS. 1, 1A, 1B, and 1C.

Assuming a shift control of the type illustrated in FIG. 1B, i.e. a "repeat H" type control, a 4th-to-5th speed compound shift involves disengaging jaw clutch 60 from 4th/8th speed input gear 24, then disengaging clutch 92 from range low speed or reduction gear 86 and engaging clutch 92 with the high speed or direct range gear 88, and then engaging jaw clutch 62 with 1st/5th speed main section gear 54. To accomplish this, the vehicle operator will preselect "HI" with the range selector button 98 prior to shifting from the ⅘ position to N and then to the ⅕ position with shift lever 72. In prior art range type transmissions, such as the 9-speed RT/RTO 11609 "Roadranger" transmission manufactured and sold by Eaton Corporation, a two-position slave valve having a first position for causing "HI" range to be selected and a second position for causing "LO" range to be selected was interlocked in one of its two positions by a plunger or the like whenever main transmission section 10 was not in neutral. Examples of such valves and interlocks may be seen by reference to above-mentioned U.S. Pat. Nos. 3,229,551; 4,450,869; 4,793,378 and 4,974,474.

As indicated previously, while these devices will, under most conditions, protect the range section synchronizers by preventing initiation of a range shift until the main section is shifted into neutral, under certain conditions the main section shift may complete prior to the auxiliary section range shift which will place the range synchronizer at risk. This is a considerably greater problem for range upshifts (4th-to-5th) than for range downshifts (5th-to-4th) as torque across the synchronizer friction cone surfaces when engaging direct range gear 88 will tend to increase the tendency of the synchronizer to hang up on the synchronizer blockers while torque across the friction cone surfaces when engaging reduction range gear 86 will tend to pull the synchronizer to an unblocked condition. Generally, in transmissions of the type illustrated in FIGS. 1 and 2, range section synchronizer burn-out is not seen as a significant problem in range section downshifts.

Referring to the transmission of FIG. 1, another serious problem may occur when a driver in 4th gear decides to upshift, preselecting a range upshift and moving the shift lever to or toward the neutral position but subsequently changes his mind and moves the shift lever back to the ⅘ position without changing the range selection. This may cause a range only 4–8 upshift and the large speed differential across the synchronizer cone friction surfaces may result in synchronizer damage. In such situations, a synchronizer may be severely damaged or destroyed within two seconds.

The auxiliary section control system/method for use with the present invention reduces the force applied by shift fork 94 to engage high speed range gear 86 to a relatively low level when a main section not neutral condition is sensed. The relatively low force is selected to be sufficient to cause the synchronized clutch to engage when synchronous conditions occur but low enough to assure that the risk of synchronizer burn out is minimized or eliminated. As illustrated and explained in greater detail with reference to FIGS. 8 and 9, the present invention provides additional protection from unintended range shifts by replacing the traditional spring bias with a variable fluid pressure bias applied to the range valve assembly so that a valve change of state will not occur in the event of an unexpected reduction or loss of system pressure.

For purposes of simplification, the present invention will be described in connection with its expected most advantageous use, namely in conjunction with a system for controlling the force applied to engage the direct or high speed synchronized range clutch of a range (10), range/splitter or splitter/range (100) type of compound transmission.

While a variable pressure pressure-regulator may be used to achieve a second force level for applying the direct range clutch, and/or for supplying the pressurized fluid bias to the range valve, in the preferred embodiments a differential area piston/valve method is utilized. As may be seen by reference to FIGS. 4–7, the range clutch actuator piston assembly 220 defines a differential area piston 221 having a first surface area 222 (about 3.96 sq. inches) pressurized to engage the low range clutch, and a second larger surface area 224 (about 4.65 sq. inches) pressurized to engage to high range clutch with the first level of force ($p*a_{224}$). Pressurizing both the surface areas will result in regulated pressure (80 psi) applied to the differential area (the second surface area 224 minus the first surface area 222) and is effective to apply the direct clutch with a relatively low second level of force ($p*(a_{224}-a_{222})$) of about 54 lbs.

Piston 221 is sealingly and slidably received in a cylinder divided into two chambers 222A and 224A. Piston 221 includes a shaft 226 to which is mounted shift yoke 94/164 for shifting synchronized clutch 92/128 to the selected positions thereof.

To provide the synchronizer protection effect, while still urging the direct range clutch into engagement, only the second chamber 224A is pressurized when a range shift into direct is selected and the main section is in neutral. Both the first 222A and second 224A chambers are pressurized when a range section shift into direct is selected and the main section is engaged in a ratio (i.e. not neutral). The second force level must be sufficient to cause a direct range clutch engagement when synchronous or substantial synchronous rotation of the high speed range clutch members is achieved. Preferably, the second force level should be sufficient to maintain the direct range in engagement (or in-gear detent means should be provided). In addition, the second force should be sufficiently low to protect the synchronizer cone clutches from substantial damage when the synchronizer is engaged on the block with the main transmission section engaged for a longer period of time, such as, for example, twenty (20) to forty-five (45) seconds. As an example, a first force of about 300 to 400 lbs. with a second force of about 40 to 80 lbs. has proven highly satisfactory.

Figure 6:
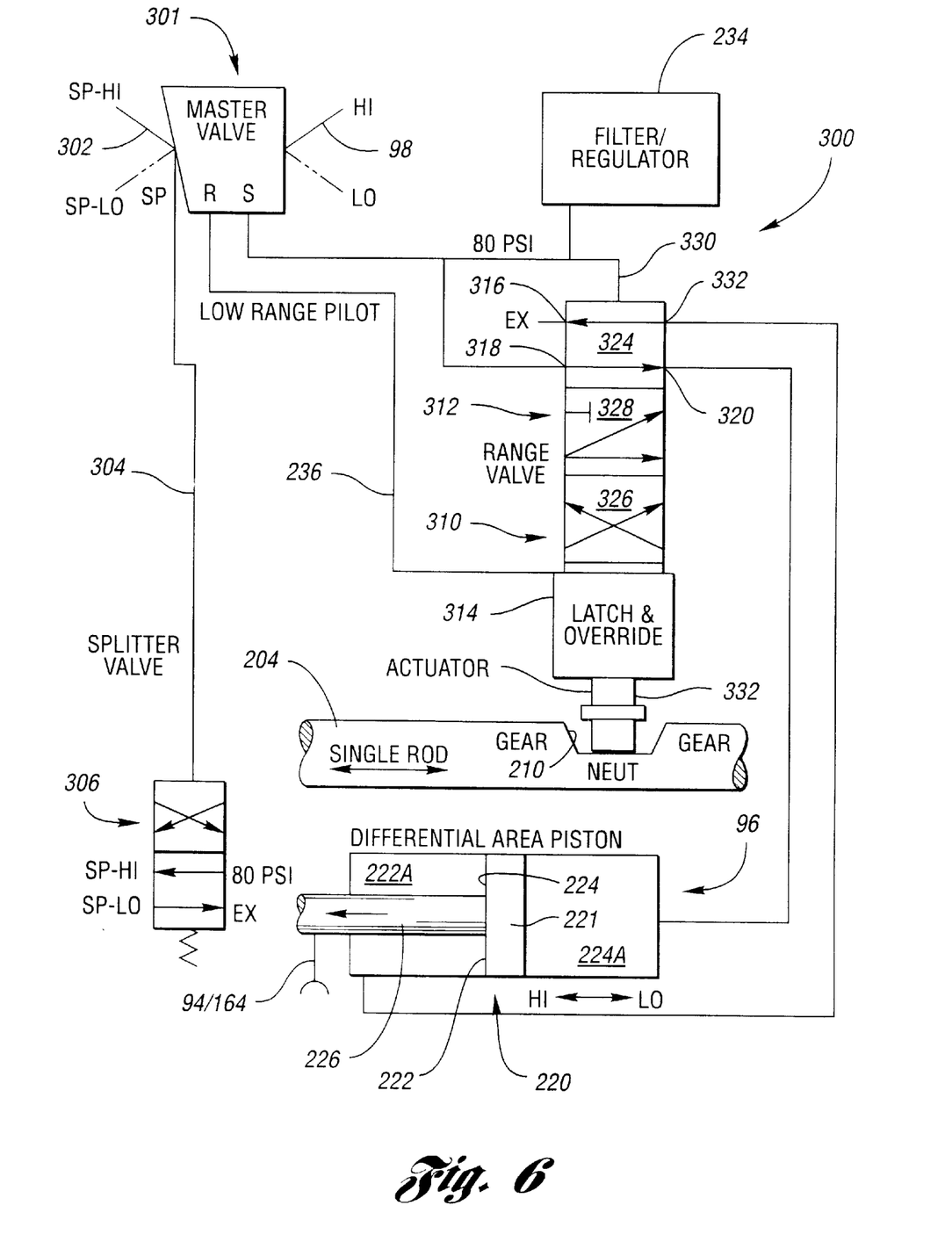
FIG. 6 is a schematic illustration of another fluid control system utilizing a valve assembly according to the present invention.
Figure 7:
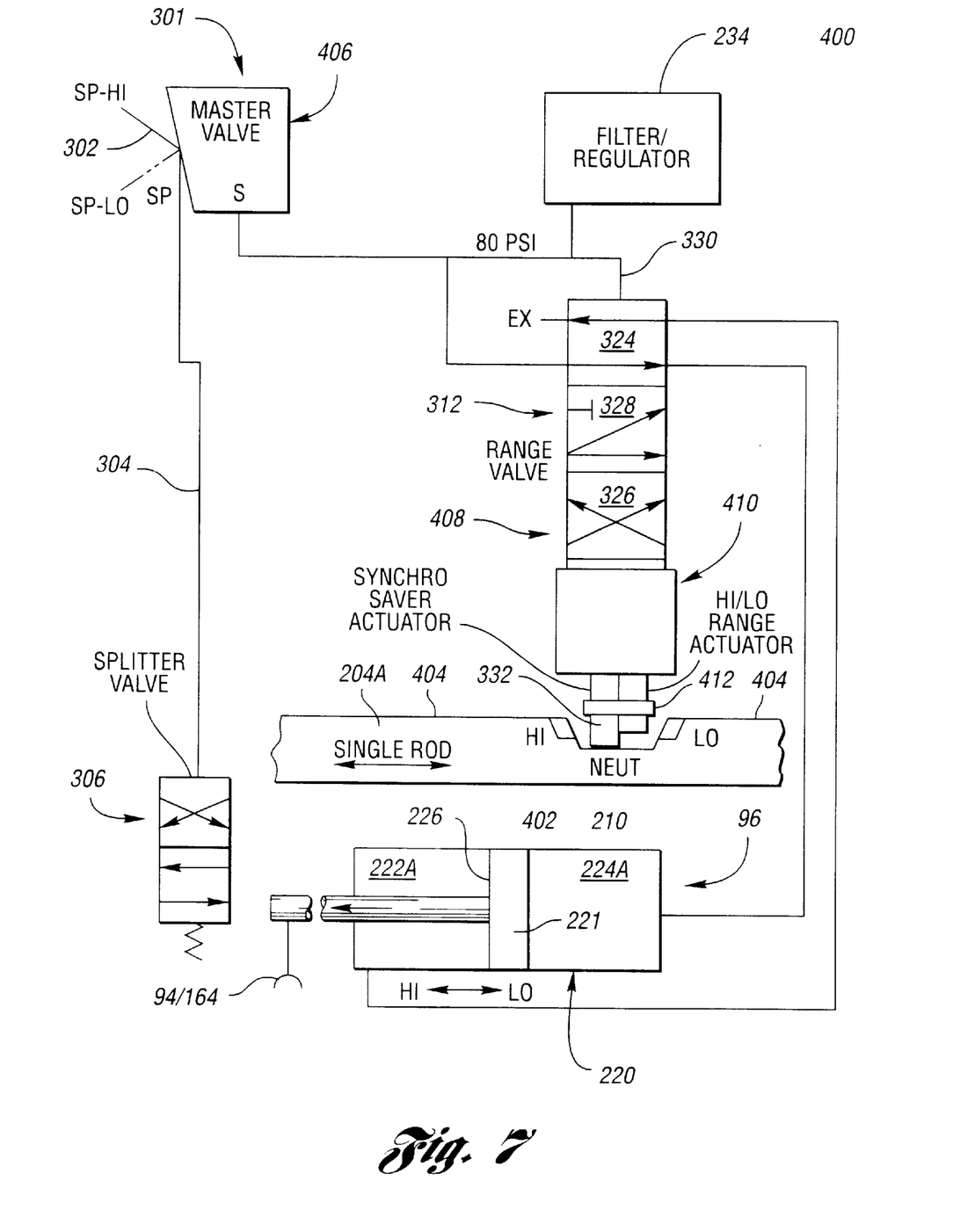
FIG. 7 is a schematic illustration of an alternate configuration of the control system illustrated in FIG. 6.
Figure 8:
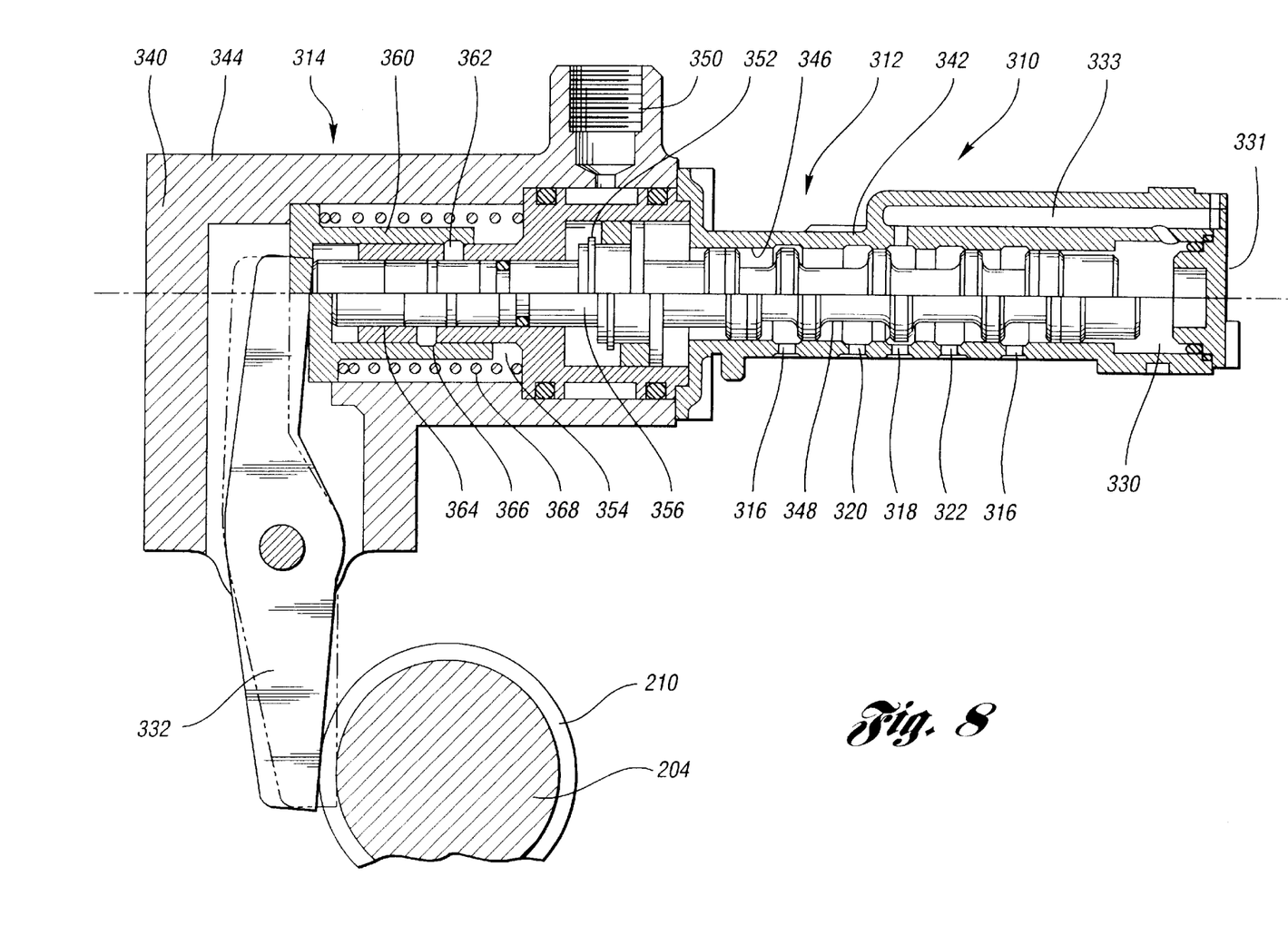
FIG. 8 is a sectional view of the valve assembly for the control system illustrated in FIG. 6.
Figure 9:
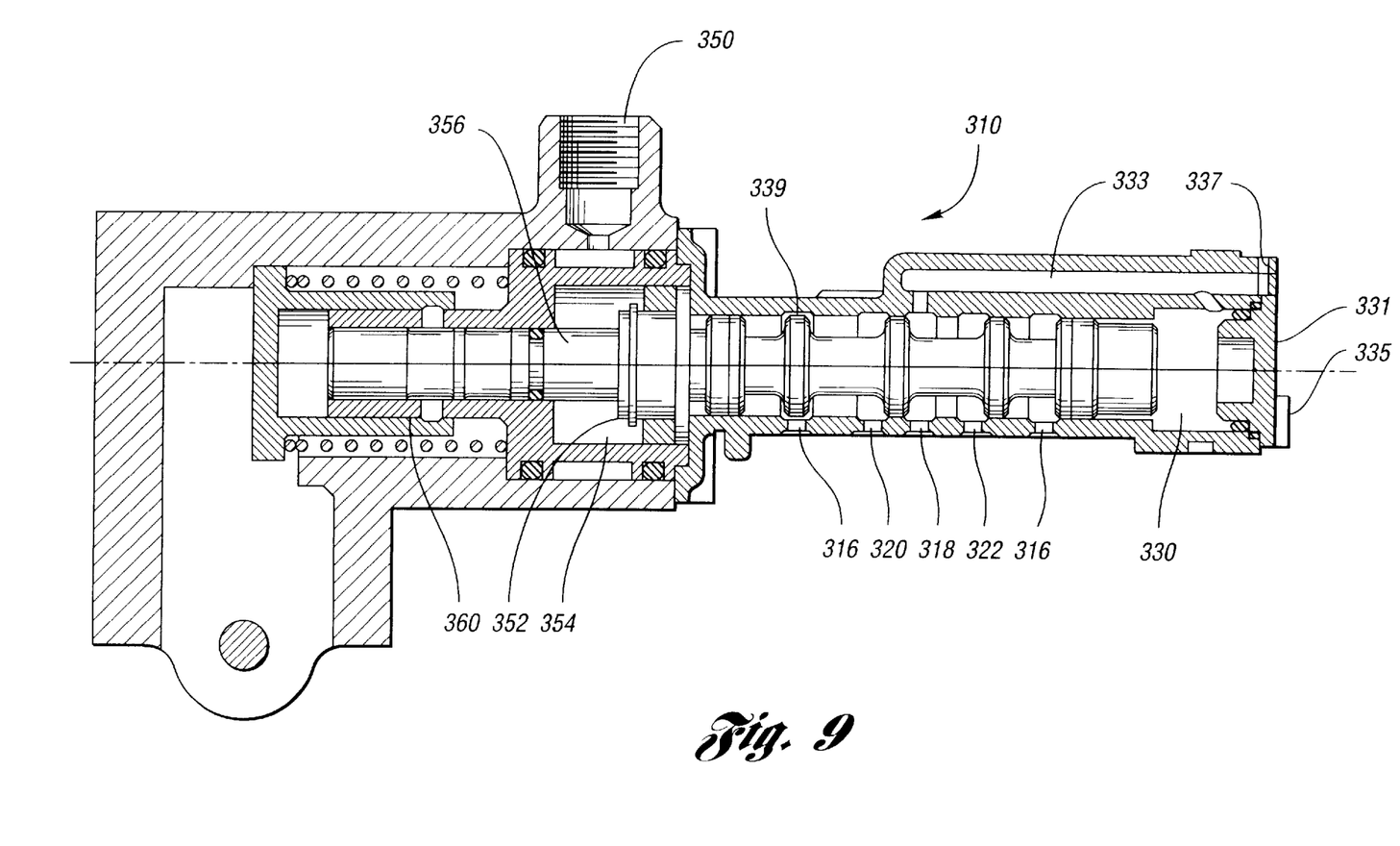
FIG. 9 is a sectional view of the valve assembly of FIG. 8 in a different operational position.

Schematics of control systems to achieve the above effect may be seen by reference to FIGS. 4–7 while a valve assembly utilizing a fluid bias according to the present invention may be seen by reference to FIGS. 8 and 9.

As indicated previously, the not engaged (neutral) and the engaged (not neutral) conditions of main section 12 of transmission 10 may be sensed by sensing axially nondisplaced or displaced positions of main transmission section shift shaft(s) 204. Such axial displacement of a shift shaft or shift rail may be sensed on the shaft or rail per se, on an extension thereof, or on a cross-shaft or the like.

Figure 4:
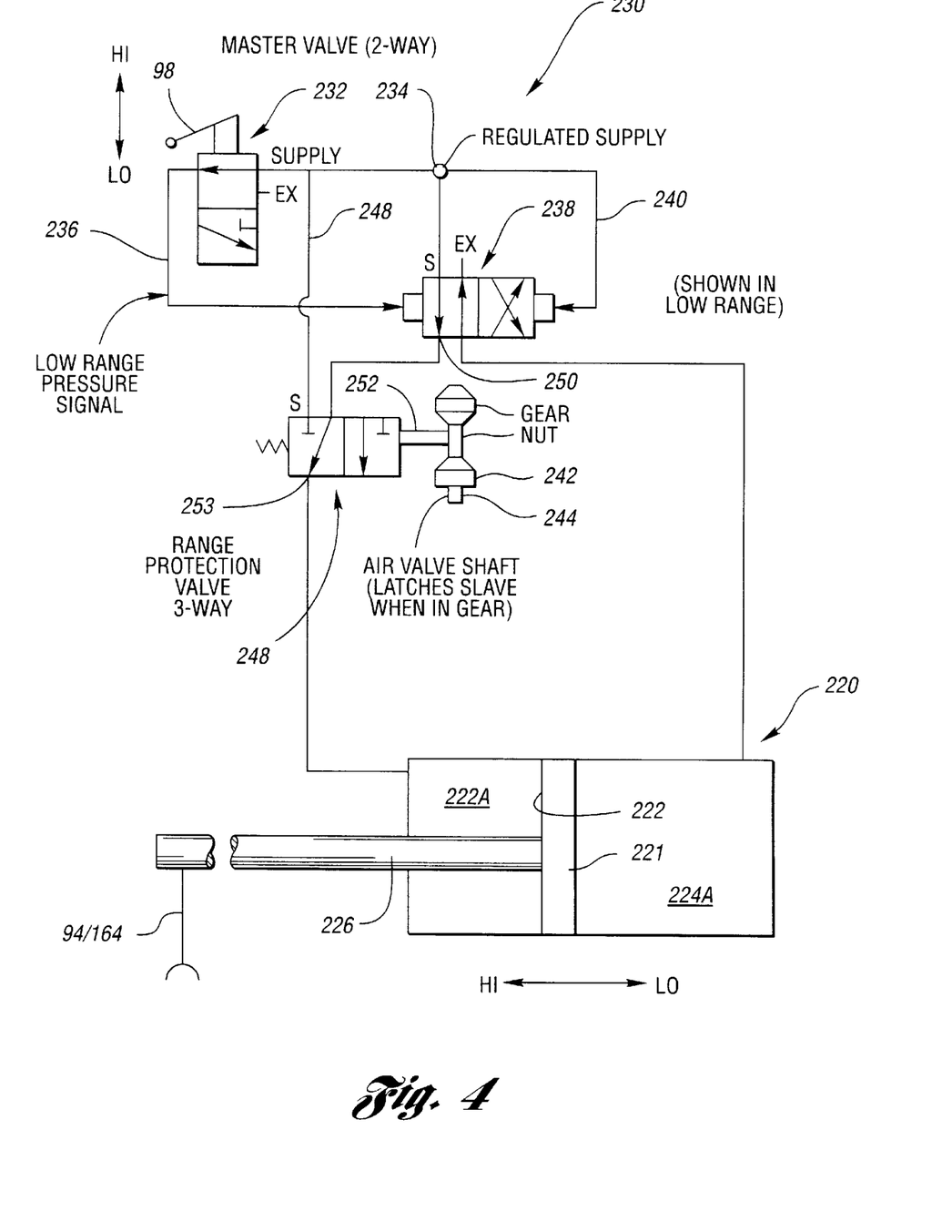
FIG. 4 is a schematic illustration of a fluid control system for implementing a fluid biased range valve according to the present invention.

A synchronizer protecting range shift air control system 230 is illustrated in FIG. 4. A master range valve 232 is connected to a source of filtered and regulated air from filter regulator 234. In heavy-duty vehicles, the regulated air pressure is usually 60 to 80 psi. Switch or lever 98 is effective to either pressurize (Low) or vent (High) the low pressure signal or pilot line 236. The low range pilot line 236 connects to a fluid biased range slave valve 238 which is a two-position, four-way valve biased to the high range position (i.e. chamber 224A pressurized and chamber 222A exhausted) by fluid bias line 240. This provides a variable biasing force based on the fluid pressure of regulated supply 234 and the differential surface area of the corresponding valve lands, similar in operation to differential area piston 220 described above. In the event of a fluid pressure drop or loss, the biasing force is reduced accordingly so that the valve will not change state from the low (pressurized) state to the high (vented) state. Pressurization of pilot line 236 creates a force opposing the fluid bias to move the valve to the low range position (i.e. chamber 222A pressurized and chamber 224A exhausted). This is preferably accomplished by providing differential valve land surface areas on the valve spool such that the regulated supply pressure from pilot line 236 is applied to a spool land having a larger surface area than the biasing land. Alternatively, a pressure regulator could be used to lower the biasing pressure and therefore the biasing force so that pressurization of pilot line 236 would overcome the biasing force to shift the valve.

A shaft 242 movable to either an in-gear position or a neutral position is provided with an interlock plunger 244 for preventing initial movement of slave valve 238 until the main section is shifted into a neutral position. A two-position, three-way range protection valve 246 is constantly connected via line 248 to source pressure and to outlet port 250 of the slave valve associated with the low range chamber 222A. Range protection valve 246 includes a plunger 252 for sensing the in-gear or neutral conditions of the main section. Outlet port 253 of valve 246 connects to low range chamber 222A of the range actuator piston assembly 220.

Components of the control systems described and illustrated with reference to FIGS. 4–7 having similar structure and function have been assigned like reference numerals for convenience.

When the main section is in neutral, as shown in FIG. 4, outlet port 250 of fluid biased slave valve 238 is connected directly through range protection valve 246 to chamber 222A. When the main section is engaged, range protection valve 246 connects low range chamber 222A to source 234, regardless of the position of slave valve 238. Accordingly, if at any time after initiation of a range shift the main transmission section is shifted into an engaged (not neutral) condition, the low range chamber 222A will be pressurized, regardless of the position of slave valve 238. This will allow normal completion of a shift into range low or a shift into range high at a considerably reduced second force.

Figure 5:
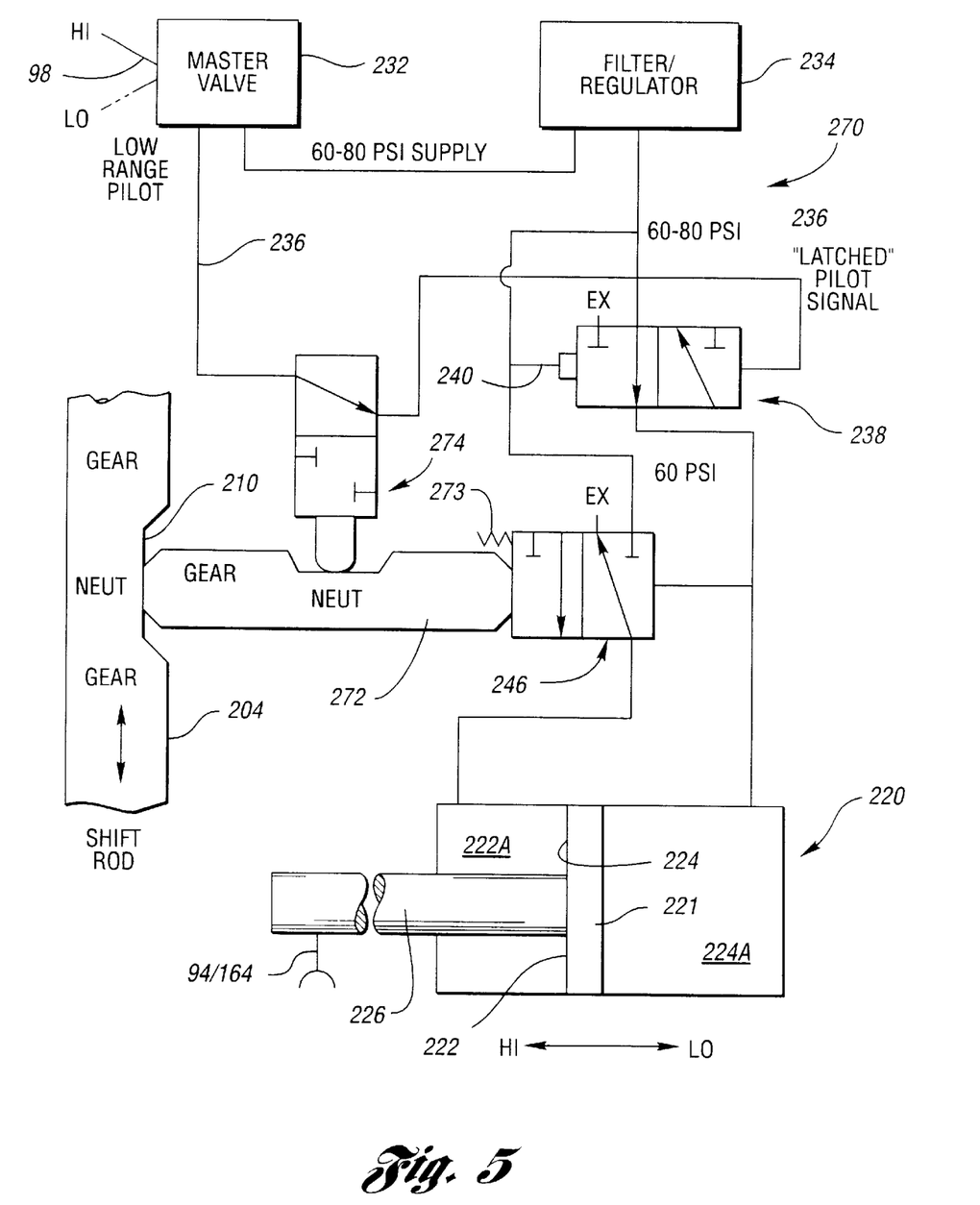
FIG. 5 is a schematic illustration of an alternative fluid control system for implementing a range protection valve assembly and fluid biased range valve according to the present invention.

A similar control system 270 is illustrated in FIG. 5. System 270 differs from system 230 described above primarily in that a shaft 272, which interacts with groove 210 in single shift shaft 204, provides a mechanical actuation for range protection valve 246 and also actuates an air rather than a mechanical interlock mechanism, interlock valve 274. Briefly, two-position, two-way interlock valve 274 will prevent pressurizing or exhausting of low pilot line 236 at the fluid biased slave valve 238 until the transmission main section is shifted into neutral. As before, slave range valve 238 includes a pressurized fluid bias 240 rather than the more traditional spring bias to reduce or eliminate the possibility of an unintended range change in the event of low system pressure. The pressurized fluid bias is based on the system supply pressure such that a decrease in the system supply pressure results in a corresponding decrease in the biasing force and the force generated by low pilot line 236.

As in system 230, range protection valve 246 will pressurize the low range chamber 222A when the main transmission section is engaged (not neutral) regardless of the positions of the other valve members. Thus, when low range is selected, and the main section is shifted to neutral, the high range chamber 224A of the piston assembly 220 is exhausted. When the main section becomes engaged, the low pressure chamber 222A will be pressurized to complete the range downshift. Valve 246 is biased rightwardly by spring 273 which is insufficient to resist the leftward bias of a pressurized line to chamber 224A.

Air control system 300 is schematically illustrated in FIG. 6. Control system 300 includes a master valve 301 similar to master valve 232 described above and having a selector switch 98 for selecting a high (HI) or low (LO) range ratio. Master valve 301 may also include a second selector switch 302 for selecting either a high (SP-HI) or low (SP-LO) splitter ratio. A splitter low pilot line 304 controls operation of a two-position three-way splitter slave valve 306. Master valves such as valve 301 are generally associated with compound transmissions of the combined range and splitter type as illustrated in FIGS. 2 and 3.

The fluid biased range slave valve assembly 310 includes a three-position, four-way valve 312 and a latch and override mechanism 314. A chamber defined by the valve body and the end of valve 312 is pressurized by fluid from bias line 330 to provide a variable biasing force. Valve 312 has port 316 connected to exhaust, port 318 connected to source air from filter/regulator 234 (nominally 80 psi), port 320 connected to high range cylinder 224A of the differential area piston assembly 220, and port 322 connected to low range cylinder 222A of the differential area piston assembly 220.

Valve 312 has a first 324 position (upper position in FIG. 6), for selecting high range, wherein high range cylinder 224A is connected to source pressure and low range cylinder 222A is vented to exhaust. Valve 312 has a second 326 position (lower position in FIG. 6), for selecting low range, wherein low range cylinder 222A is connected to source pressure and high range cylinder 224A is vented to exhaust. Valve 312 has an intermediate or third 328 position wherein both the high (224A) and the low (222A) range cylinders are connected to the source pressure.

The valve 312 is fluid 330 biased into the first (324) or high speed range position and may be moved to its second (326) or low speed range position by action of low range pilot pressure from line 236. This may be accomplished by applying the same source pressure to differential areas of valve 312 to create a net force in the downward direction of FIG. 6, or alternatively by providing a lower biasing pressure using a pressure regulator or the like. However, the biasing pressure should decrease proportionally with the supply pressure in pilot line 236 so that reduction or loss of pilot pressure while switch 98 is in the LO position will not result in an unintended change of state and subsequent range shift to HI range. By mechanical means of an override actuator lever or link 332 interacting with the notches 210 and adjacent lands on shift shaft 204, the valve is movable from the first (324) position to the intermediate third (328) position if the main transmission is shifted to an engaged position while the valve is in the first position.

The latch function of the latch and override assembly 314 is to prevent the valve from moving from the first 324 to the second 326, or from the second 326 to the first 324 position when the main section is in neutral while allowing movement of the valve from the first 324 to the intermediate 328 third position. The latch and override assembly thus provides the range interlock function of preventing initiation of a range shift until the main section is shifted into neutral. A specific structure for the valve 312 and the latch and actuator assemblies 314 is illustrated in FIGS. 8 and 9 and described in greater detail below.

In operation, for a shift from high to low range ratio, selector 98 will be moved to select/preselect the "LO" position and pilot line 236 will be pressurized. When the shift shaft position indicates the main section is in neutral, the latch 314 will release allowing the valve mechanism 312 to assume the second position 326 which will cause pressurizing of low range chamber 222A and exhaust of high range chamber 224A. The override does not affect the valve in the second position 326, and thus the positioning of valve 312 will remain as is until selector 98 is moved.

To shift from low to high range ratio, the selector 98 will be moved to select/preselect the "HI" position and the pilot line 236 will be exhausted. As soon as the shift shaft position indicates a main transmission neutral condition, the latch is released and valve 312 will move to the first 324 position by the force created by fluid bias 330. High range chamber 224A will be pressurized and low range chamber 222A will be exhausted. Thereafter, as the transmission main section is engaged, actuator link 332 will move valve 312 from the first position (324) to the third or intermediate position (328) wherein both the high range chamber (224A) and low range chamber (222A) of cylinder 220 are pressurized to provide a reduced force on the shift fork, 94 or 164, urging the high speed range synchronized clutch into engagement.

An air control system 400 for use with a "double HI" shift mechanism is illustrated and described with reference to FIG. 7. Control system 400 uses a single shift shaft 204A with relatively smaller diameter portions 402 and relatively larger diameter portions 404, respectively, corresponding to operation in the high range or low range portion, respectively, of the "double HI" pattern. As such, an operator actuated range switch, such as switch 98A of FIG. 6 is no longer necessary. Likewise, master valve 406 differs from master valve 301 in that only a splitter selector switch or button 302 is provided.

The valving portion 312 of valve assembly 408 is substantially similar to valving portion 312 of valve assembly 310. However, the actuator portion 410 of valve assembly 408 differs considerably from the latch and override portion 314 of valve assembly 310. In addition to the link member 332 which cooperates with neutral notch 210 to move the valving portion 312 from the first 324 to the second position 328 upon sensing a main section engaged condition, a second, independent, link or lever 412 is provided. Lever 412 is the high/low range actuator and cooperates with raised surfaces 404 on shift shaft 204A to move valve portion 312 to the second position 326 as shift shaft 204A is rotated into the high range portion of the "double H" pattern.

The structure of the fluid biased range slave valve assembly according to the present invention is illustrated and described with reference to FIGS. 8 and 9. Fluid biased range slave valve assembly 310 is contained within a housing 340 defining a spool housing or valve body portion 342 and a latch and override mechanism portion 344. Valve spool portion 342 defines an internal bore 346 in which is received a valve spool 348 and also defines ports 316 (two), 318, 320, and 322 connected to exhaust, supply, low range piston chamber 222A, and high range piston chambers 224A, respectively. A port 350 for connection to the low speed pilot line 236 is defined in the latch and override portion 344. The leftward end of valve spool is provided with a piston surface 352 sealingly and slidably received in a chamber 354 communicating with port 350. A pressurized fluid bias is provided by chamber 330 at the rightward end of bore 346. Chamber 330 is defined by the rightward land of valve spool 348, valve bore 346, and end cap 331. Chamber 330 is connected by channel 333 to pressurized fluid supply via port 318. The fluid bias provides a variable leftward force on spool 348 which varies proportionally with the pressure of the common pressurized fluid supply. As such, a reduction or loss of pressure reduces the biasing force proportionally to any force applied by the pressurized supply through pilot port 350 (i.e. while "LO" range is selected) so that the net force will remain rightwardly and the valve will not change state thereby preventing an unintended range shift.

The first position 324 of valve 312 corresponds to the most leftwardly position of valve spool 348 as seen in the upper half of FIG. 8. In this position, ports 318 and 322 are in fluid communication, ports 320 and the left port 316 are in fluid communication, and the right port 316 is sealed from the other ports. Channel 331 connects port 318 and chamber 330 to provide a leftward bias via pressurized fluid from the common supply.

The second position 326 of valve 312 corresponds to the rightwardly position of valve spool 348 as illustrated in FIG. 9. In this position, ports 318 and 320 are in fluid communication, ports 322 and righthand port 316 are in fluid communication and the left hand port 316 is sealed from the other ports. Chamber 330 remains in fluid communication with port 318 via channel 331. As illustrated in the left upper and lower portions of FIG. 9, spool 348 may be urged to the rightward or second position either by pressurizing the chamber 352 through port 350 and low range pilot line 236 (FIG. 9) or by means of a lever or link 355 similar to lever 332 but acting on large diameter surface of a shaft utilized in a double H shift pattern and push rod portion 356 of spool 348.

The third or intermediate position 328 of valve 312 is illustrated in the lower portion of FIG. 8. In this position, both ports 320 and 322 fluidly communicate with source port 318 and both exhaust ports are sealed from the other ports. As may be seen by reference to FIG. 8, when lever actuator 332 rides on the outer surface of shaft 204, the lever will engage a portion of push rod 356 to urge the spool to the intermediate position thereof. It is noted, that when the spool is in the rightward most position, i.e., the second position 326 of valve 312, the override lever 332 (see FIG. 8) will not affect the position of the spool.

The latch function of the latch and override assembly 314 provides the range interlock function to prevent initiation of a range shift until the main transmission section is shifted into neutral. This is accomplished by collet 360, detent roller 362, and grooves 364 and 366 in the push rod extension 356 of valve spool 348. Detents 362 are received in slots in housing portion 344 for radial movement and the outer surface of push rod extension 356 includes a first detent groove 364 which will align with the detent rollers when the spool is in the second position thereof (FIG. 9) and a second detent groove 366 which is elongated and will align with the detents when the spool is in either the first position or in the second position or is in transit therebetween. When collet 360 is in the retracted position under the bias of spring 368 (see the top of FIG. 8 and FIG. 9), the detents balls or rollers 362 are movable radially outwardly and will not effect axial movement of the valve spool 348. However, when the collet is pushed rightwardly by the lever 332 (see the bottom of FIG. 8) the detent rollers 362 are locked against axially outward movement and the spool 348 is interlocked in either the first to the intermediate (third) axial position or in the second axial position.

An alternative design for a "double H" type shift pattern is illustrated in FIG. 9. The low range pilot line 236 may be omitted and a modified or additional actuator lever and shift shaft 204 utilized to mechanically shift valve 312 against the bias provided by pressurized fluid within chamber 330 into the second 326 low range position thereof in response to position of the shift lever into the low range portion of the "double H" shift pattern.

End cap 331 of valve body 342 is preferably sealingly secured thereto via screws 335 and O-ring seals 337. Flat fluorocarbon disc seals, such as disc seal 339, are provided on the various valve lands. Preferably, the land seals have a left to right taper such that they are generally frustoconical in shape to provide an improved wiping action. Various other seals and fasteners shown are conventionally utilized in these or similar applications and are not specifically enumerated for the sake of clarity.

Thus, the present invention provides a range slave valve having a bias force which varies in proportion to the supply pressure such that a drop or loss of supply pressure does not result in a valve change of state and prevents an unintended range change.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A valve assembly for use in a control system for controlling a pressurized fluid operated shift actuator for an auxiliary transmission section of a compound transmission including a main transmission section having engaged and not-engaged positions connected in series with said auxiliary transmission section, said auxiliary transmission section including a selectable high speed ratio and a selectable low speed ratio, each of said ratios engageable by a synchronized jaw clutch assembly, said actuator including a differential area piston having a first piston surface defining a first chamber and a second piston surface defining a second chamber, said first piston surface area being larger than an area defined by said second piston surface, pressurization of said first chamber causing said actuator to urge said synchronized clutch assembly to engage said high-speed ratio and pressurization of said second chamber causing said actuator to urge said synchronized clutch assembly to engage said low-speed ratio, said system including an indicator for indicating a current engaged or not engaged condition of said main transmission section, a selector for selecting a desired auxiliary section ratio, a common source of pressurized fluid and an exhaust, said valve assembly including a three-position valve having a first position for pressurizing said first chamber and exhausting said second chamber, a second position for pressurizing said second chamber and exhausting said first chamber and a third position for pressurizing both said first and second chambers and override means cooperative with said means for indicating the current engaged or not engaged condition of said main transmission section for urging said valve from the first to the third position thereof when said main section is in the engaged condition thereof, said valve assembly characterized by:

biasing means for biasing said valve toward said first position using fluid from said common source of pressurized fluid.

2. The valve assembly of claim 1 wherein said valve includes pilot means responsive to said selector to overcome force generated by said biasing means to move said valve from said first to said second position.

3. The valve assembly of claim 1 wherein said biasing means comprises:

a valve body defining an axially extending bore, said valve body defining four ports opening to said bore including a first port connected to said exhaust, a second port connected to said source, a third port connected to said second chamber, and a forth port connected to said first chamber;

a valve spool slidably and sealingly received by said valve body, said valve spool having a first axial position in said bore for establishing fluid communication between said first and third ports and between said second and forth ports, a second axial position in said bore for establishing fluid communication between said first and fourth ports and between said second and third ports, and a third axial position for establishing fluid communication between said second, third and fourth ports and blocking said first port from the other ports;

an end cap sealingly attached to said valve body, said end cap cooperating with said valve body and said valve spool to define a chamber, said chamber being supplied with pressurized fluid from said source to bias said valve spool toward said first position.

4. The valve assembly of claim 3 wherein said valve body includes a channel connecting fluid from said second port to said chamber.

* * * * *